United States Patent

[11] 3,542,475

| [72] | Inventor | Ronald F. Cooper<br>Plainview, New York |
| --- | --- | --- |
| [21] | Appl. No. | 751,553 |
| [22] | Filed | Aug. 9, 1968 |
| [45] | Patented | Nov. 24, 1970 |
| [73] | Assignee | Alphanumeric, Incorporated<br>Lake York, New York<br>a corporation of Delaware |

[54] OPTICAL FOCUSING
5 Claims, 9 Drawing Figs.

[52] U.S. Cl. .................................................... 356/122,
356/123, 356/124, 356/126; 95/44
[51] Int. Cl. .................................................... G01j 1/00;
G01b 9/00
[50] Field of Search .......................................... 356/122,
123, 124, 126; 95/44

[56] References Cited
UNITED STATES PATENTS

| 2,134,757 | 11/1938 | Goldsmith ..................... | 95/44 |
| --- | --- | --- | --- |
| 2,254,548 | 9/1941 | Ruehle et al. ................. | 356/126 |
| 2,771,004 | 11/1956 | Sachtleben .................... | 356/124 |
| 2,792,748 | 5/1957 | Whitney et al. ................ | 356/126 |
| 2,818,775 | 1/1958 | Ullrich ........................ | 356/126 |
| 3,356,854 | 12/1967 | Humphrey ..................... | 356/122 |
| 3,438,713 | 4/1969 | Heynacher et al. ............. | 356/124 |

*Primary Examiner* — Ronald L. Wibert
*Assistant Examiner* — J. Rothenberg
*Attorney* — Camil P. Spiecens

ABSTRACT: This invention relates to the method and apparatus of determining when a projected image is in focus by moving the projected image relative to and across an optical grating to modulate the projected image, the amplitude of the differential between the maximum level of light and the minimum level of light of the modulated image indicating the focus of the projected image.

Patented Nov. 24, 1970
3,542,475
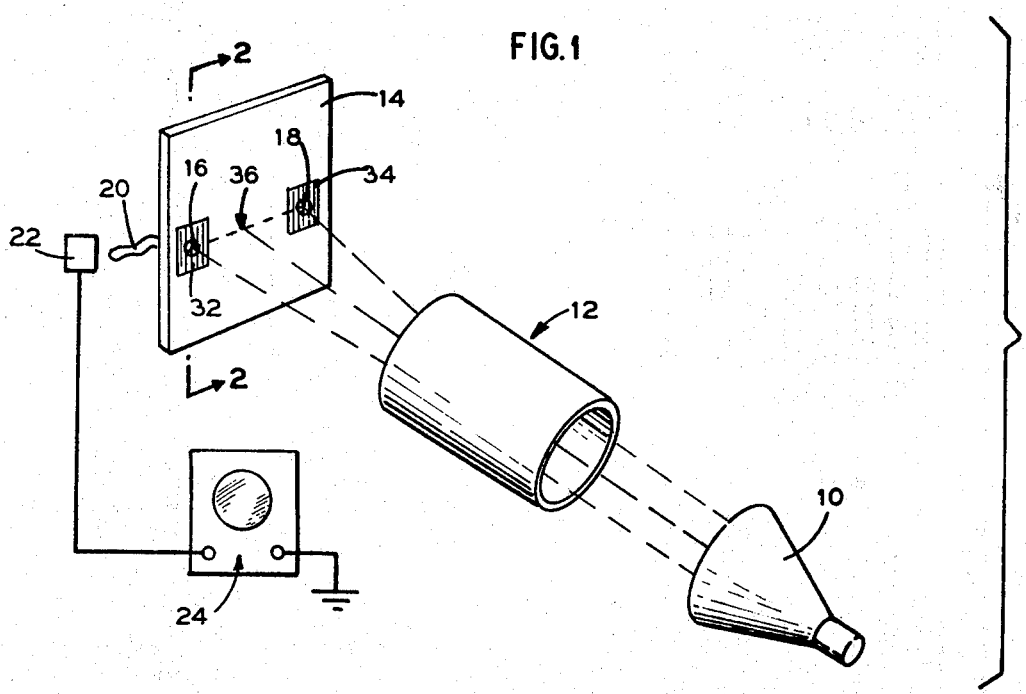
FIG.1
FIG.2
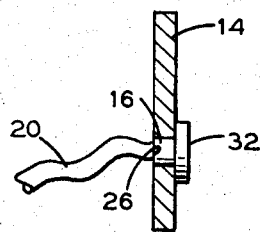
FIG.3
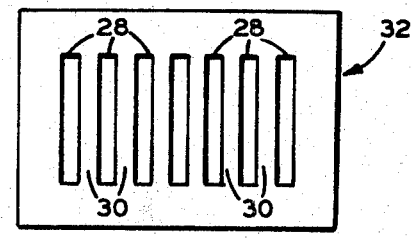
FIG.5
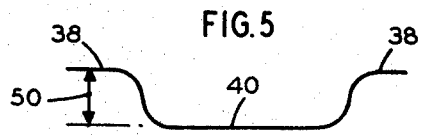
FIG.4
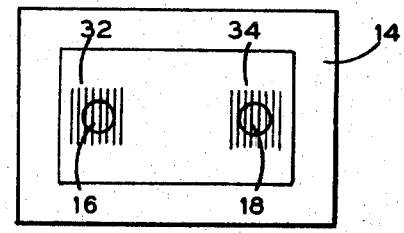
FIG.6
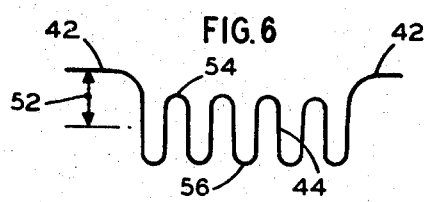
FIG.7
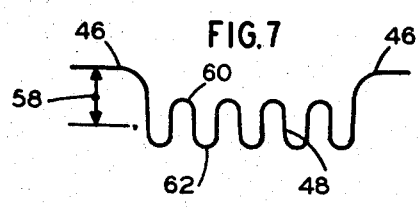
INVENTOR.
Ronald F. Cooper
BY
ATTORNEY

OPTICAL FOCUSING

This invention relates generally to an optical system and more particularly to a method of and apparatus for quickly adjusting an optical system to focus precisely a projected image.

In optical systems it is important not only to be able to determine when a lens is adjusted to provide an image which is in sharp focus, but it is also important to be able to determine if the lens provides an image which is in sharp focus at each of its extremes and at each point between the extremes.

In an optical system, the pressure plate, the back plate against which a film is positioned, can have a slight dimple or rise which can affect the position of the film relative to the lens and, therefore, affect the focus of the image. In such instances, it is possible for the image to be in focus at all points other than that part where the dimple or rise occurs.

In still another instance such as can occur where the lens has slight imperfections it would be desirable if the pressure plate could be designed with undulations, a rise and or a depression to compensate for lens imperfections to permit the forming of an image that is in focus at all points.

In the reproduction of images generated by a cathode ray tube, it is extremely important that the optical system interposed between the face of the cathode ray tube and the pressure plate and film onto which the image is to be projected is in sharp focus. If it is realized that the luminous spot generated on the face of the cathode ray tube is approximately .00075 (7½ ten-thousands) of an inch in diameter, it readily becomes obvious that it is extremely difficult to adjust an optical system to focus the spot onto a surface—even in those instances where the lens system introduces magnification of the order of 2:1, 3:1, 4:1 or the like. A small diameter spot or dot does not present an area or an edge sufficiently large to permit visual determination of in focus conditions to be accurately made.

In a similar situation, the focusing of a telescope onto a pin point source of light—a distant star— is extremely difficult and, therefore, it would be helpful if a simplified and accurate method of focusing a telescope type of optical system could be obtained.

It is an object of this invention to provide a device which can be used to focus an optical system.

It is also an object of this invention to provide a device which can be used to detect optical imperfections in a lens system.

It is another object of this invention to provide a device which can be used to correct optical imperfections in a lens system.

It is still another object of this invention to provide a device which can be used to quickly determine if an optical system is in sharp focus.

It is an additional object of this invention to provide a device which is reliable in operation and economical to build.

Other objects and many of the attendant advantages of this invention will be readily appreciated as the invention becomes better understood by reference to the following detailed description when considered in connection with the accompanying drawings wherein:

FIG. 1 is a view in perspective of an optical system in accordance with the principles of this invention;

FIG. 2 is a view of a section along the line 2-2 of FIG. 1;

FIG. 3 is a greatly enlarged front view of an optical grating;

FIG. 4 illustrates the positioning of the grating on the pressure plate or image receiving surface according to the principles of this invention;

FIG. 5, 6 and 7 are wave forms which can be obtained when practicing the principles of this invention;

Similar reference characters refer to similar parts throughout the several views of the drawings.

Figure 8:
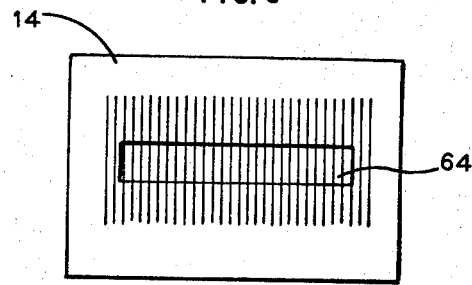
FIG. 8 is a view of another embodiment of structure in accordance with the principles of this invention.

Referring to FIG. 1, there is illustrated an optical system in accordance with the principles of this invention. A spot of light such as that generated by a cathode ray tube 10 is positioned to face a lens system 12 designed to project the image of the spot onto a pressure plate or image receiving surface 14. In those instances where the image of the spot generated on the face of the cathode ray tube 10 is to be projected onto and recorded by film, then the image receiving surface 14 will be in the form of a pressure plate which functions as a back plate for the film.

The plate 14 supports a first opening 16 and a second opening 18 each of which can be circular and each of which extends through the plate 14 from the front surface to the back surface. The opening 16, 18 are positioned to occur at the extreme positions of the image projected onto the plate. One end of a light transmitting means 20 such as a rod of lucite or a bundle of fiber optics is positioned to sense and transmit light which enters opening 16; and one end of another light transmitting means such as a rod of lucite or a bundle of fiber optics is positioned to sense and transmit light which enters opening 18.

A light sensitive means 22 such as a photo multiplier tube is positioned to receive light transmitted through the light transmitting means 20; and a second light sensitive means such as a photo multiplier tube is positioned to receive light transmitted through the light transmitting means from opening 18. A cathode ray oscilloscope 24 is coupled to selectively display the signals generated by the the photo multiplier tubes.

FIG. 2 is a view along the line 2-2 of FIG. 1 illustrating the positioning of the light transmitting means relative to the opening 18. In those instances where a bundle of fiber optics is used to transmit light, the end 26 of the bundle is positioned back from the front of opening 16 to permit defocusing and spreading of the light entering opening 16 to permit many fibers to transmit light to the photo multiplier tube. In those instances where a lucite rod is used the end 26 of the rod can be positioned within the opening 16 flush with the front f surface of the plate 14.

In operation, the cathode ray tube is energized and the spot which appears on the face of the tube is adjusted to its smallest possible diameter. In most instances, the light spot on the face of the cathode ray tube can be adjusted to a diameter of seventy-five ten-thousandths of an inch (.00075). The cathode ray tube is then coupled to a drive and sweep network to sweep the spot back and forth across the face of the tube such that the image of the path of travel of the spot, when projected through the lens system 12 onto the plate 14 transverses the openings 16, 18.

If the lens system 12 is designed to provide an amplification of 2:1; then the lens system and the spot on the plate 14 will be in focus when the spot is at its smallest diameter. In those instances where the spot diameter on the face of the cathode ray tube is .00075 of an inch and a lens system having an amplification factor of 2:1 is used; then the spot projected onto the plate 14 will be in focus when its diameter is .0015 of an inch.

Initially, a coarse optical grating 32 having substantially 200 line pairs per inch can be positioned over the openings. Referring to FIG. 3, normally an optical grating consists of a plurality of black or opaque spaces 28 interposed between transparent spaces 30, the width of the opaque spaces 28 being equal to the width of the transparent spaces 30; and, going from left to right, the spacing from the left hand edge of a first opaque space to the left hand edge of the next occurring opaque space being one two-hundredth of an inch.

FIG. 4 illustrates the positioning of the optical grating 32 in front of opening 16; and the positioning of the optical grating 34 in front of opening 18.

As the spot of light traverses the face of the cathode ray tube, its image is projected along a path on the plate 14 defined by the dotted line 36, the extremities of the path of the projected spot extending across the optical gratings 32, 34 and the openings 16, 18 positioned behind said optical gratings. Movement of the projected spot of light across the grating produces pulsating or modulated light which is sensed by the light transmitting means and directed to energize the light sensitive means 22.

The modulated light is generated by the image of the light spot traversing the optical grating as follows: as the image of the light spot approaches and moves across an opaque space 28 it is partially or completely blocked (depending on the diameter of the spot relative to the width of the opaque space) and the light passed to the light sensitive means through the light transmitting means is reduced. As the image of the light spot begins to move passed the opaque space and through a transparent space 30, the light passed to the light sensitive means through the light transmitting means is increased.

Thus, as the projected spot of light traverses the optical grating, a pulsating or modulated source of light is fed to the light sensitive means 22 which generates a modulated signal. This signal is fed to and displayed by the cathode ray oscilloscope 24.

Referring to FIGS. 5, 6, and 7, there are some of the various wave forms which can be observed on the face of the oscilloscope for varying degrees of focus of the spot of light projected onto the plate 14.

Referring to FIG. 5, there is illustrated the wave form observed on the oscilloscope when the spot projected by the lens system 12 onto the plate 14 is completely out of focus. The wave form is illustrated in an inverted manner as the output signal of the photo multiplier tube goes negative with increase in light intensity. In FIG. 5, the lines 38 represent the absence of light on the photo multiplier tube; and, the line 40 represents the presence of light on the photo multiplier tube. During those instances when the diameter of the spot is large relative to the widths of the opaque spaces 28 of the optical grating, such as occurs when the spot is far out of focus, and the light sensed by the photo multiplier tube will never be sufficiently blocked by opaque spaces 28 of the optical grating to provide a varying or modulated light for the photo multiplier tube, and a negative going steady state signal will be generated by the photo multiplier tube each time the image of the light spot passes through the optical grating to the photo multiplier tube.

Referring now to FIG. 7, there is illustrated the wave form observed on the oscilloscope when the spot projected by the lens system 12 onto the plate 14 is approaching focus. In this instance, the line 46 represents the absence of light on the photo multiplier tube; and, the line 48 represents the presence of light on the photo multiplier tube. During this instance, the diameter of the spot is approaching the width of the opaque spaces 28 of the optical grating, and the opaque spaces 28 of the optical grating block a portion of the projected image sufficient to provide a varying or modulated light for the photo multiplier tube.

Referring now to FIG. 6, there is illustrated the wave form observed on the oscilloscope when the spot projected by the lens system 12 onto the plate 14 is further in focus. In this instance, the line 42 represents the absence of light on the photo multiplier tube, and, the line 44 represents the presence of light on the photo multiplier tube.

In each of the FIGS. 5, 6, 7; the distance 50 is equal to the distance 52 (the mean of the peaks 54, 56 of line 44); and, is also equal to the distance 58 (the mean of the peaks 60, 62 of line 48). However, the distance or spacing between the peaks 54, 56 is a slight but visually determinable distance greater than the distance between the peaks 60, 62.

Thus, by simply observing the wave form of the signal displayed by the oscilloscope as the lens is adjusted for the occurrence of a modulated signal having the greatest amplitude or spacing between peaks will mark the focusing of the projected spot on the plate 14.

An optical grating having 200 line pairs per inch provide a first or coarse focusing of the projected spot onto the plate 14. By substituting an optical grating having 350 line pairs per inch for the optical grating having 200 line pairs per inch and further adjusting the lens system for the occurrence of a signal having the largest spacing between peaks will result in a finer focusing of the projected spot on the plate 14.

In one application of the principles of this invention where a spot having a diameter of approximately .00075 of an inch on the face of a 5 inch cathode ray tube is projected through a lens system having an amplification of 2:1 to a plate positioned 36 inches form the face of the cathode ray tube, the use of two optical gratings, the first having 200 line pairs per inch and the second having 350 line pairs per inch were found to permit quick and accurate focusing of the lens system to project a spot having a diameter of substantially .0015 of an inch onto the plate.

It was interesting to note that in some instances, as the operator became familiar with the use of the structure of this invention, the fine adjusting optical grating only could be used to accurately adjust the optical system, the course optical grating not being required.

While optical grating having various line pairs per inch can be used, it has been determined that an optical grating having line pairs substantially equal to the diameter of the spot being focused will provide good results. This, in those instances where the spot diameter being focused is 1.5 thousands of an inch, then the distance across an opaque space and a an adjacent transparent space of the optical grating should be substantially 1.5 thousands of an inch.

The use of two openings 16 and 18 as illustrated in FIG. 1 is helpful in determining if the spot projected is in focus at two extremes of its projected area. Naturally, the two openings can be positioned along a vertical line or a line positioned at any desired angle to either a vertical or horizontal line.

Additionally, if desired, the area between the two openings 16, 18 can be removed to provide a continuous opening 64 (FIG. 8) which extends across the plate 14 and is covered with an optical grating having a desired number of line pairs per inch. Positioned behind the opening 64 are a plurality of light transmitting means arranged to direct received light to a single photo multiplier tube or a plurality of photo multiplier tubes. Now, by observing the signal on the oscilloscope as the projected spot of light traverses the opening 64, it is possible to quickly, easily and accurately determine if the spot is in sharp and uniform focus across the entire e length of the opening 64. Variations in focus can be caused by optical defects in the lens system or by a plate 14 which is not absolutely flat. In either instance it is possible to correct the system to provide a projected beam that is in sharp focus across the opening 64 by providing hollows or rises as required within the plate.

In those instances where the optical characteristic of a lens is required during or after manufacture and/or assembly, the principles of this invention can be utilized to determine trueness or ability of a lens to focus an image sharply along all points of its projected image.

In those instances where a stationary spot of light such as a distant star viewed through a telescope is to be focused onto a plate, the structure of this invention is modified to provide an optical grating which can be moved passed an opening.

Figure 9:
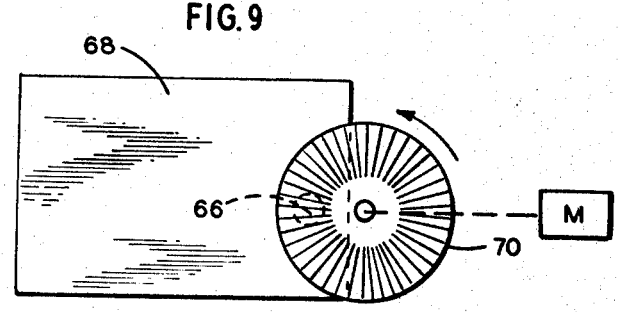
FIG. 9 is a view of still another embodiment of structure in accordance with the principles of this invention.

Referring to FIG. 9, the spot of light is positioned to project through the opening 66 of the plate 68. An optical grating 70 having a desired number of line pairs per inch is positioned in front of the opening 66 and coupled either directly or through a flexible shaft, a belt and pulley assemblage or the like to a small fractional horse power motor for rotation about its center. Rotation or movement of the optical grating 70 passed the opening 66 when focusing a stationary spot of light is the equivalent of moving the beam of light passed a stationary optical grating. The moving optical grating modulates the projected light which, when sensed by the photo multiplier tube, generates signals as illustrated in FIGS. 5, 6 and 7 to enable the optical system to be quickly, easily and accurately focused.

The optical grating used in this invention consisted of opaque and transparent spaces on a transparent base and is similar to a photographic negative. In those instances where a photographic reproduction is desired of the projected image, the transparent base was positioned adjacent to the opening in the plate, and the surface of the transparent base supporting the opaque and transparent spaces was positioned to face the direction of the source of the projected image. In this manner, if the base of the optical grating is of the same thickness as the base of the photographic film, then the image will be in focus on the emulsion of the film.

Thus, by placing the optical grating onto a base which is of the same thickness as the base of the photographic film—the base upon which the light sensitive emulsion is placed—and by positioning the optical grating such that the base contacts the plate 14, then the optical grating will be spaced from the plate 14 a distance equal exactly to the distance that the light sensitive emulsion will be spaced from the plate 14 when the film is substituted for the optical grating. Thus, by positioning the optical grating a distance from the plate 14 that is equal to the distance that the light sensitive material is spaced from the plate 14, the focusing of the image with the use of the optical grating will also present the same focused image onto the film emulsion.

In those instances where the thickness of the base of the optical grating is different than the thickness of the base of the film, the lens can be readjusted after being focused within the use of the optical grating to compensate for the difference of thickness of the bases; the degree of adjustment required being obtained from calculation using parameters of the optical system.

Obviously many modifications and variations of the present invention are possible in the light of the above teachings. It is, therefore, to be understood that within the scope of the appended claims the invention may be practiced otherwise than as specifically described.

I claim:

1. In record medium recording apparatus, the combination for determining the degree of focus of a light spot projected onto a record medium carrying back plate, said combination comprising a light generating means for generating a spot of light that repetitively traverses a given path, a back plate for receiving the light generated by said light generating means, means for focusing the moving spot of light onto said back plate whereby the moving spot of light traces a second given path across a surface of said back plate, said back plate being provided with at least one aperture intersecting the second given path, a grating means positioned adjacent said surface in front of the aperture, said grating means comprising a plurality of alternating transparent and opaque segments which intersect and modulate the light spot as it moves along the second given path, and electro-optical transducer means behind said grating means to detect modulated light transmitted by the grating means for generating a pulsating electrical signal, the amplitude of said signal being indicative of the degree of focus of said spot.

2. The combination of claim 1 wherein said light generating means comprises cathode-ray tube means.

3. The combination of claim 1 wherein said back plate is provided with two apertures, each of said apertures intersecting the second given path and adjacent different ends thereof, and said grating means being positioned in front of each of the apertures.

4. The combination of claim 3 wherein said light generating means comprises cathode-ray tube means.

5. The combination of claim 1 wherein the width of said segments is the same order of magnitude as the diameter of the spot of light.